United States Patent [19]

Woolner

[11] 3,831,090

[45] Aug. 20, 1974

[54] CONTROL METER

[75] Inventor: Henry R. Woolner, Manchester, N.H.

[73] Assignee: Modutec Incorporated, Norwalk, Conn.

[22] Filed: Dec. 14, 1971

[21] Appl. No.: 207,821

[52] U.S. Cl. .............................................. 324/157
[51] Int. Cl. ........................................... G01r 11/02
[58] Field of Search ..... 324/157; 350/113; 340/266; 116/129 F, 129 K

[56] References Cited
UNITED STATES PATENTS

| 427,022 | 4/1890 | Weston | 324/154 R |
|---|---|---|---|
| 3,332,014 | 7/1967 | Orths et al. | 324/157 |
| 3,588,516 | 6/1971 | Friedman | 324/157 X |

FOREIGN PATENTS OR APPLICATIONS

| 1,548,758 | 8/1969 | Germany | 340/266 |
| 928,466 | 6/1963 | Great Britain | 324/157 |

*Primary Examiner*—Alfred E. Smith

[57] ABSTRACT

A control meter has a first pointer that rotates about an axis. Also disposed on the meter assembly is a manually actuated element having a variable electrical value and a second pointer to indicate said value, the two pointers rotating about said same axis, and the second pointer preferably being mounted directly on the stator of the meter, although the manually actuated element itself is located to one side of said axis. Said first pointer moves relative to and in front of a slotted scale, while said second pointer is disposed behind the scale and is viewable through the slot. Non-linearities between the meter-first pointer and element-second pointer relationships are compensated for by means of a non-linear transmission means operatively interposed between the element and the second pointer.

16 Claims, 11 Drawing Figures

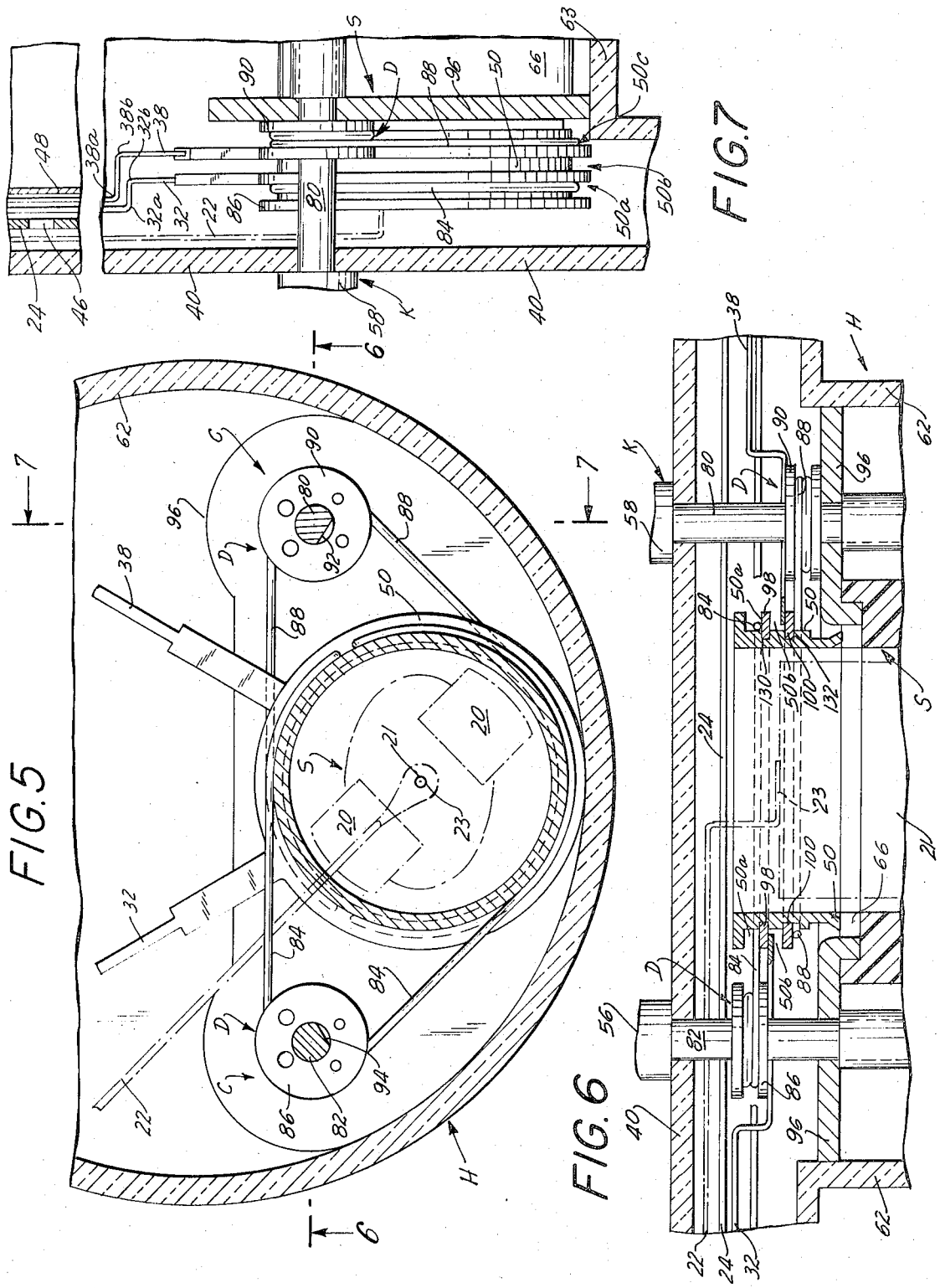

CONTROL METER

BACKGROUND OF THE INVENTION

The present invention relates to meters, and more particularly to meters having a controllable element disposed on them.

Frequently, it is desired to measure the magnitude of a parameter such as voltage, temperature, current, fluid concentration, etc., and either control it within defined limits or at least activate an alarm when said magnitude of said parameter goes beyond a limit so that an operator can take appropriate action. An instrument which accomplishes this is called a control meter, which incorporates both a meter and at least one controllable element, such as a variable resistor, in one assembly. The meter portion is connected to measure the magnitude of said parameter, while the control element is connected to an external control circuit so as to define the control limit of that parameter. Typically, there are two controllable elements that define high and low parameter limits respectively. When the meter-measured parameter bears a given relationship to the output parameter of the element, a given control function occurs. Coincidence of the meter pointer with the element pointer should occur at that time, as a result of which the element can be set to perform its desired control function by setting its pointer to the corresponding meter-measured parameter.

A typical prior art control meter had a measuring pointer disposed on the front of the dial to indicate the measured parameter magnitude and two settable limit pointers connected to the two controllable elements also disposed on the front of the dial to indicate the values to which those elements are set. The three pointers must be able to move without mechanical interference with each other, and in the past the meter case was made to project forward of the scale a considerable distance to provide the necessary clearance for such movement. In addition, mounting the element pointers together with the controlled elements themselves on the meter cover, as has been done in the past, greatly complicates construction, adds expense, inhibits visibility, and results in a very unattractive appearance.

With a plurality of pointers difficulty is often experienced in determining which pointer indicates what. Even the use of different colors for the meter pointer and the indicators for the manually controlled elements really does not solve the problem, particularly when the meter is in a poorly lighted location, or when it is viewed obliquely rather than from directly in front, and if the pointers are of different sizes one may obscure another.

The rotational relationships (input vs. output) of one or the other or both of the meter and element will usually vary, yet it is important that the meter pointer and the element pointer track one another, so that the controlled element can be set accurately to perform its desired control function at the proper metermeasured parameter value.

It is the prime object of the present invention to devise a control meter in which accurate meter-matched setting of the control elements can be readily accomplished.

It is another object of the present invention to provide a control meter that is more compact and pleasing in appearance than prior art control meters.

It is a further object to provide a control meter that reduces the probability of human error in reading the indicator pointer.

It is a still further object to have a control meter that has control and measuring indicating means ruggedly mounted for movement about the same axis.

It is yet another object of the present invention to provide a simple and fool-proof drive between the control element and its associated pointer which compensates for all non-linearities in the system, both those relating to the input-output relationships of the individual elements and those deriving from the particular shaping and calibration of the scale and its graduations.

Briefly described, these results are achieved as follows: The control meter assembly comprises a case within which a conventional stator-rotor type meter unit is mounted, the meter rotor being associated with a pointer which rotates over a scale plate carrying a graduated scale. A manually actuated control element is also mounted on the case, preferably to one side of the meter unit. It too has a pointer associated with it, but that pointer is mounted coaxial with the meter pointer, and preferably directly on the stator chassis of the meter, even though the associated control element is not thus coaxial with the meter. Hence both the control element and its associated pointer may each be optimally mounted, each without disadvantaging the other or any other part of the assembly. The control element pointer may be mounted on the opposite side of the scale plate from the meter pointer, that plate being provided with a slot through which the rearmost pointer may be viewed. Hence the two pointers are clearly and unmistakably differentiated, so that the chance of confusing one for the other is vanishingly small. The operative driving connection between the control element and its associated pointer is so constructed as to ensure that the two pointers accurately track one another and the scale past which they move. As a result compactness of design, maximization of visibility, minimization of cost, enhancement of attractiveness and improved accuracy of operation are all achieved.

To the accomplishment of the above, and to such other objects as may hereinafter appear, the present invention relates to a control meter as defined in the appended claims and as described in this specification, taken in junction with the drawings in which:

FIG. 5 is a cross sectional view of the lower half of the meter taken along the line 5—5 of FIG. 3 and showing the control element pointer drive means;

FIG. 6 is a cross sectional view of said drive means taken along the line 6—6 of FIG. 5;

FIG. 7 is a cross sectional view of said drive means taken along the line 7—7 of FIG. 5;

Figure 4:
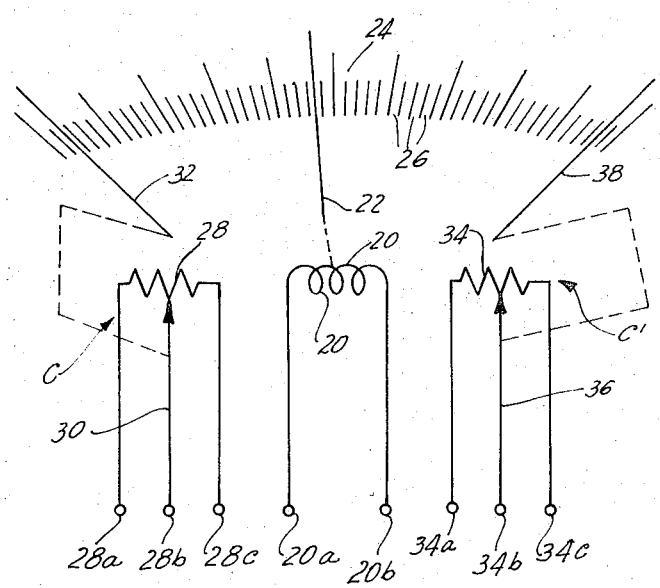
FIG. 4 is an electrical diagram of the control meter.

FIG. 4 shows the general electrical diagram of a control meter in accordance with the present invention. Rotor coil 20 is connected through its terminals 20a and 20b to receive an external electrical energization to be measured. Coil 20 is disposed within a permanent magnet stator generally designated S (not shown in FIG. 4) so that it rotates about an axis 23 in accordance with the magnitude of the applied energization. An indicating pointer 22 is mechanically coupled to coil 20 to rotate therewith and is disposed in front of scale plate 24 having a plurality of calibration or scale marks 26 thereon. These marks 26 can represent amperes, volts, etc. depending upon the particular physical quantity to be measured. A first control element C in the form of a variable resistor 28 is mounted on the casing or housing H that encloses the entire meter, has its ends connected to terminals 28a, 28c, and has a variable tap 30 connected to terminal 28b. A manually actuatable means such as knob K is mechanically connected to the tap 30 to adjust or vary its position along resistor 28, and hence the resistance between terminal 28b, and terminals 28a, 28c. This resistance in turn controls an external circuit that performs a desired control function, e.g., causes the measured parameter to stay within a limit. A first settable control pointer 32 is disposed proximate scale plate 24 and is mechanically coupled to the knob K that controls the position of center tap 30 by a driving connection generally designated D. Therefore the control limit can be determined by viewing pointer 32 and calibration marks 26 on scale plate 24. Since one usually wishes to control in accordance with upper and lower limits of a given parameter, a second control element C' in the form of variable resistor 34 is mounted on said case and has its ends connected to terminals 34a and 34c. It also has a variable tap 36 that is connected to terminal 34b. Terminals 34a, 34b and 34c are also connected to the external control circuit so that by adjusting variable tap 36 by means of a manually actuatable means such as knob K, a second limit on the magnitude of the physical quantity can be set. A second settable control pointer 38 is disposed proximate said scale 24 and is drivingly coupled to tap 36 by a driving connection D so that the value of said second limit can be determined by viewing pointer 38 and calibration marks 26. Typically, tap 30 would be adjusted to set a minimum low value on the magnitude of the parameter that is to be controlled, while tap 36 would be set to a maximum desired value of said magnitude. However, these functions can be interchanged as will be explained below. If terminals 20a, 20b are connected to receive said energization, pointer 22 would then indicate the actual value of said physical quantity.

Figure 1:
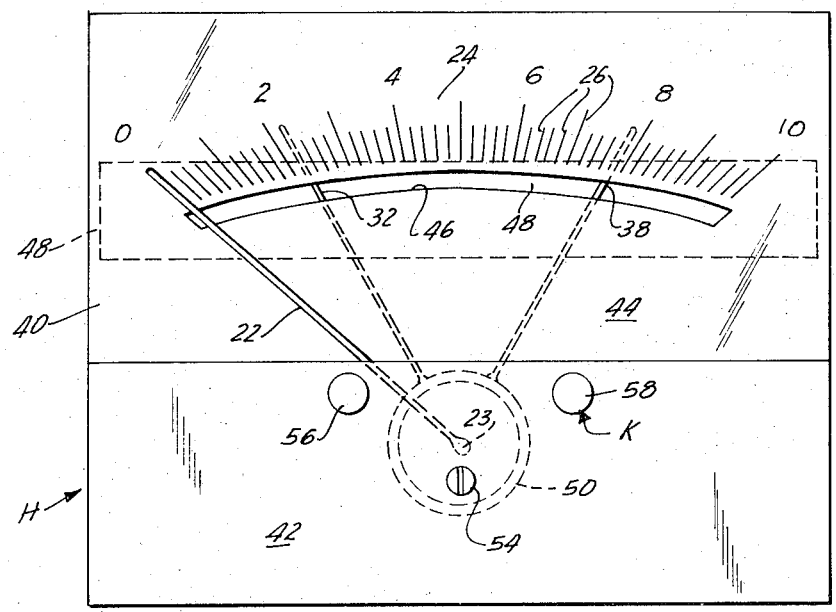
FIG. 1 is a front elevational view of a control meter in accordance with the invention.

Turning now to the constructional details, FIG. 1 shows a front view of the meter which is enclosed by a casing or housing H, having a lower section 42 and an upper section 44, the upper section comprising a transparent window 40. Scale plate 24 has an arcuate slot 46 along which the scale graduations 26 are disposed. The meter pointer 22, rotatable about axis 23, is located between window 40 and scale plate 24. Control element pointers 32 and 38, however, are located behind scale plate 24, so that portions only of them are visible through the slot 46. Hence pointers 32 and 38 are easily distinguished from the indicating pointer 22, thereby reducing the chance for human error in confusing one with the other. Disposed on the other side of pointers 32 and 38 from the scale plate 24 is a mirror 48, shown in dotted lines in FIG. 1, that enhances the visibility of pointers 22, 32 and 38, and particularly the latter two.

A set screw 54 is accessible from the exterior of lower housing section 42 and may be rotated to zero-set pointer 22 when no energization is applied to terminals 20a and 20b of rotor coil 20. Knobs K, individually designated 56 and 58, project forwardly from lower housing section 42 and are in line with the variable resistors 28 and 34 respectively, to control the position of their respective taps 30 and 36 and hence their resistance value.

Figure 2:
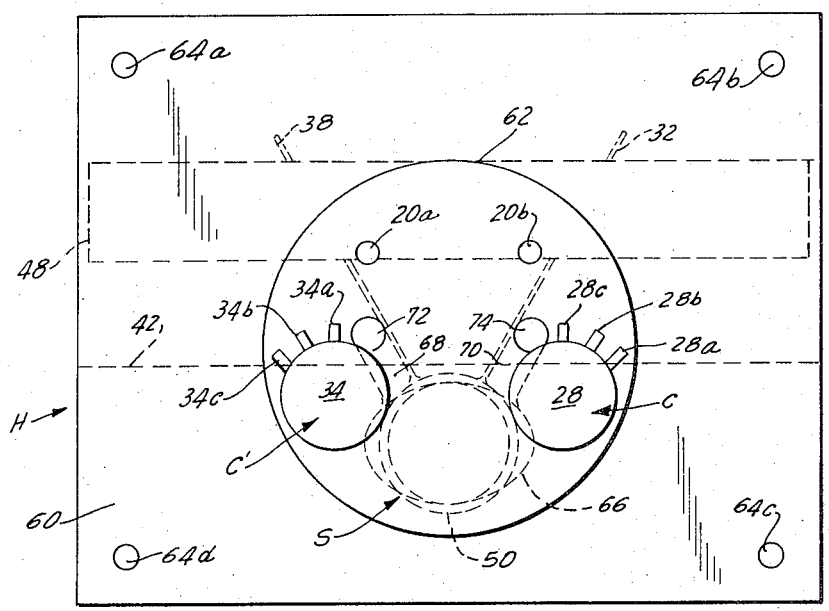
FIG. 2 is a rear elevational view thereof.
Figure 3:
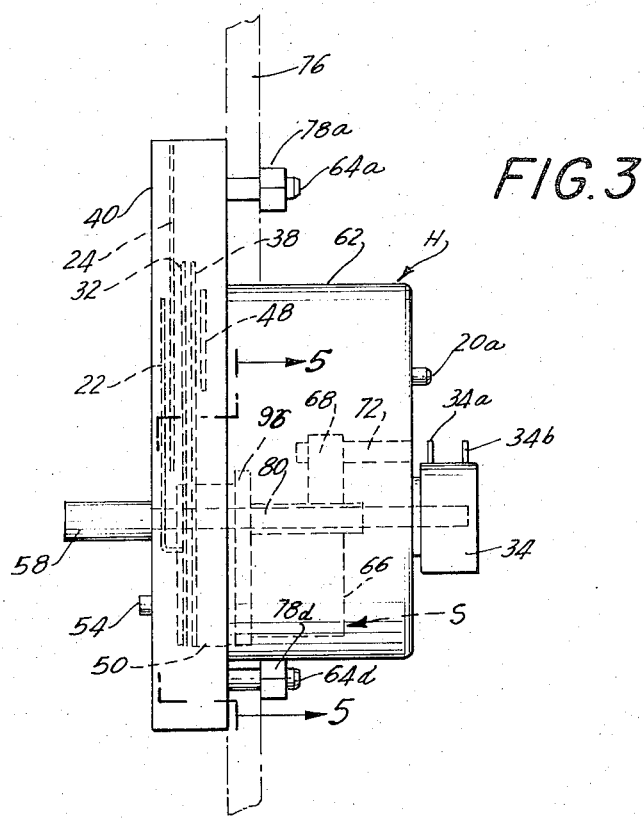
FIG. 3 is a side elevational view of the control meter when mounted on a panel.

As best shown in FIGS. 2 and 3, the meter has a rear surface 60 and a rearwardly projecting cylindrical casing 62, the latter housing the meter proper. Projecting rearwardly from surface 60 are mounting screws 64a, 64b, 64c and 64d which, in conjunction with nuts 78a–d, secure the meter to a panel 76. The variable resistors 34 and 28 are mounted on and project from the rear of casing 62. Lugs 68 and 70 extend from stator 66 so it can be mounted on cylindrical enclosure 62 by means of members 72 and 74 respectively.

The stator S of the meter proper, within which the rotor coil 20 is rotatably mounted, is provided with a cylindrical rearward extension 50 coaxial with the axis. That extension 50 has a pair of independently rotatable rings 98 and 100 mounted thereon. Control pointers 32 and 38 are mounted on rings 98 and 100 respectively for rotation therewith. In this way the control pointers 32 and 38 are mounted directly on stator S coaxially with meter pointer 22. As may perhaps best be seen in FIGS. 6 and 7, pointer 32 is bent at points 32a and 32b, and pointer 38 is bent at points 38a and 38b, so that pointer 32 is disposed in front of pointer 38 with clearance therebetween, both pointers moving between scale plate 24 and mirror 48 even though their planes of mounting on extension 50 are located axially to the right thereof as viewed in FIG. 7. Therefore, both pointers 32 and 38 can be rotated through the entire range of scale 24, thus enabling both of the control limits to be set anywhere throughout said range. It will be seen that this enables a simple reversal of the functions of resistors 28 and 34, i.e., if desired, resistor 28 can be used to set the higher limit, and resistor 34 can be used to set the lower limit.

Rotor coil 20 is mounted within stator S on a soft iron core 21 which is quasi-elliptical in shape to compensate for the fact that, as specifically disclosed, the graduated scale 26 is arcuate about a center displaced from the axis 23 of pointer 22.

Shaft 80 operatively connects knob 58 to variable resistor 34. Shaft 82 operatively connects knob 56 to the variable resistor 28. Manual rotation of these shafts 80, 82 will control the resistance value of resistors 34, 28 respectively. Disposed on shaft 80 is an eccentric pulley 90 which comprises the driving connection D to pointer 38. Disposed on shaft 82 is eccentric pulley 86 comprising the driving connection D to pointer 32. Dial cord 84 is wrapped around pulley 86 and is secured to ring 98, thus being operatively connected to pointer 32, thus operatively connecting knob 56 through shaft 82 to pointer 32. Likewise dial cord 88 is wrapped around pulley 90 and secured to ring 100, thus being operatively connected to pointers 38, thus operatively connecting knob 58 through shaft 80 to pointer 38.

The function of the driving connections D comprising the pulleys 86 and 90 is to compensate for differences in the relationships between the inputs and the output indications as between the meter and/or the control elements over their respective operating ranges. For example, a given voltage difference in the input to the meter may give rise to a different displacement of the meter pointer 22 if that voltage change occurs near the low end of the scale or near the upper end of the scale, whereas corresponding displacements of the rotational inputs to the control elements may give rise to the same change in voltage output no matter when that change occurs. The same scale 26 cannot function for both without compensation. Alternatively, or in addition, the scale 26 may be non-linear relative to the rotation of knobs K and the change in top voltage produced thereby. These and similar differences are compensated for by the non-linear effective shape of the operative peripheries of the pulleys 86 and 90, which are rotated with the input shafts 80 and 82 and which by virtue of those non-linear peripheries cause appropriate movement of the control element points 32 and 38 respectively. As can be seen in FIG. 5, shafts 80 and 82 have flat keyed portions 92 and 94 respectively to receive complementary flat keyed sections in the pulleys 90 and 86 respectively. This assures that the eccentricity of the pulleys 90 and 86 is in a proper direction when they are mounted on the shafts 80 and 82. A mounting plate 86 is disposed within cylindrical rear housing 62 and receives the shafts 80 and 82, the drum 50, and the stator 66 to produce rugged mounting.

Figure 8:
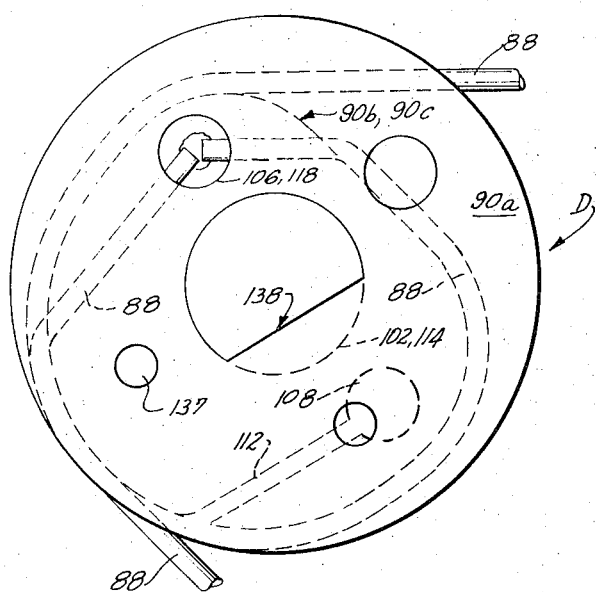
FIG. 8 is a side elevational view on an enlarged scale of the eccentric pulley that is used in the drive means between the control element and its associated pointer.
Figure 9:
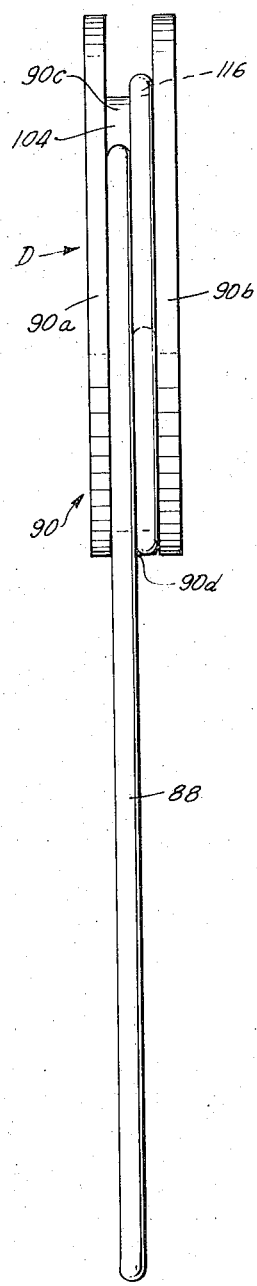
FIG. 9 is an end view of the eccentric pulley of FIG. 8 showing the dial crod disposed thereon.
Figure 10:
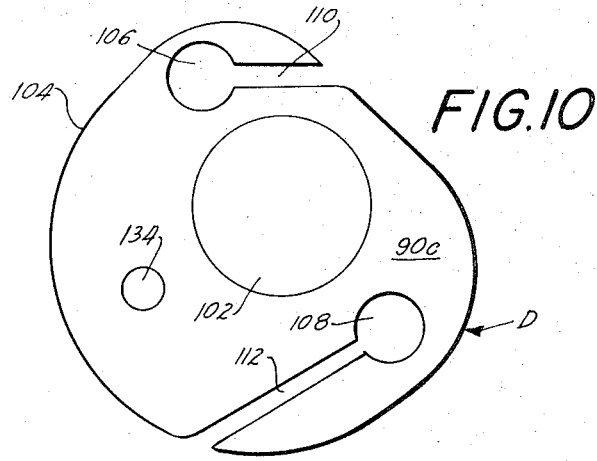
FIG. 10 is a plan view of one eccentric inner pulley section.
Figure 11:
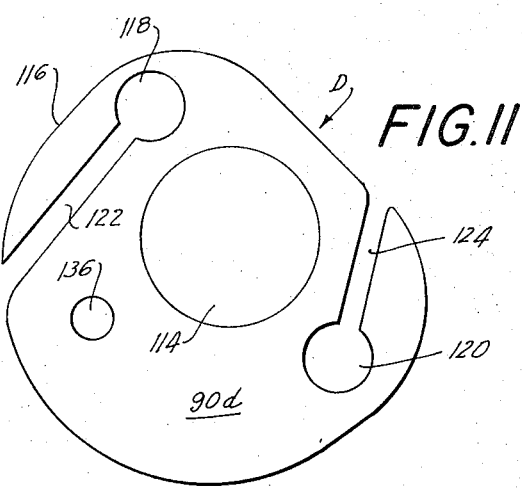
FIG. 11 is a plan view of the other eccentric inner pulley section.

FIGS. 8-11 show the details of the pulleys 86 and 90, pulley 90 being chosen by way of example. As may be seen in FIG. 9, pulley 90 comprises front plate 90a and rear plate 90b that serve as guides for the dial cord 88, and center sections 90c and 90d. FIG. 8 shows that front plate 90a has an aligning hole 137 and a keyed center hole 138 for receiving shaft 80. Rear plate 90b has the same construction as front plate 90a. Center section 90c is shown in detail in FIG. 10. It has a central hole 102 for receiving the shaft 80, a non-linear outer surface 104 that has a shape to provide the desired motion compensation, an aligning hole 134, and two dial cord securing holes 106 and 108 which communicate with the outer surface by means of channels 110 and 112 respectively. FIG. 11 shows center section 90d. It comprises a central hole 114 for receiving shaft 80, a non-linear outer surface 116 that provides the desired motion compensation, an aligning hole 136, and dial cord securing holes 118, 120 which communicate with the outer surface 116 by means of channels 122 and 124 respectively. The entire pulley 90 is assembled by matching up the aligning holes 137, 134 and 136 of pulley sections 90a, 90b, 90c and 90d so that the nonlinear surfaces 104 and 116 respectively are congruent and then securing all sections together. Then the pulley 90 is placed on its shaft 80 so that keyed central hole 138 is received on flat portion 92 of that shaft. As shown in FIG. 8, dial cord 88 is secured in hole 118, run through channel 122, disposed partially about outer surface 116 and then goes to ring 100, into which it is secured. It comes back to pulley 90 to meet outer surface 104 and is almost completely disposed around said surface 104 and passes through channel 110 into securing hole 106. For pulley 90, holes 108 and 120 and their respective channels 112 and 124 are not used. Pulley 86 can be made up of the same sections as pulley 90 because of their inherent symmetry. For pulley 86 it will be appreciated that these holes 108 and 120 are used to secure the dial cord 88, and the holes 106, 118 are not so used.

In operation, the terminals 20a, 20b are connected to receive an electrical energization that corresponds to the parameter which is to be measured by the meter. This can be electrical energy itself, or temperature, fluid density, or any other of a number of quantities that have been converted into electrical energy for determination of their magnitude by the meter. The electrical energization applied to the terminals 20a, 20b will cause the rotor coil 20 to rotate within the stator 66 and thus cause a deflection of pointer 22. Since the rotor magnet 21 is quasielliptical, it will compensate for the displacement of the radial center of arcuate scale 26 from axis 23, and thus indicator 22 and calibration marks 26 will give an accurate reading of the magnitude of said physical quantity. The potentiometers 28 and 34 would be connected to circuits that will give either a visual or audible alarm if the electrical energization exceeds limits set by the potentiometers 28, 34, or to circuits that will directly control the value of said energization to bring it within the defined limits. The limits themselves are easily settable by adjusting the knobs 56, 58 and determinable by viewing pointers 32, 38 and scale 26. Typically, pointer 32 will be set to define the lower limit and pointer 38 will be set to define the upper limit. However, this is not a restriction and their functions can be interchanged because the pointers 32 and 38 can pass each other because of the positioning of the spools 98, 100 on the drum 50. It will be appreciated that the pointers 32 and 38 give an accurate reading relative to the meter pointer 22 because of the non-linear surfaces 104, 116 of cam sections 90c, 90d respectively over which the coils 88 and 84 are wound.

It will be appreciated that the present invention achieves a control meter with settable pointers which is compact because the settable pointers rotate concentrically with the indicating pointer. The meter is compact and also attractive because of the upward displacement of its pointers' axes with respect to the radial center of its arcuate ascale. The meter is less prone to human error because the settable pointers are disposed behind the scale so that only a portion of the settable pointers are viewable through a slot in the scale, and therefore they are readily distinguishable from the indicating pointer. The invention is also accurate because the non-linear pulleys correct for all non-linearities in the composite system.

Although the present invention has been disclosed with respect to but a single embodiment, it is to be understood that many variations may be made therein, all without departing from the spirit and scope of the invention as defined in the following claims. I claim:

1. A meter comprising a case; a scale mounted within said case and having a plurality of calibration marks disposed thereon; a rotatable first pointer disposed within said case and extending across said calibration marks; means for rotating said first pointer about an axis in accordance with an electric energization applied to said rotating means; a controllable element mounted on said case at a point laterally displaced from said axis;

means operatively connected to said controllable element for controlling said element; a second pointer extending across said marks; means for mounting said second pointer for rotation about said axis and for operatively connection said second pointer to said control means, whereby the value of said element can be determined by viewing said second pointer and said marks, wherein said mounting means comprises a hollow drum disposed concentric with said rotating means, said first pointer being mounted by means which is at least partially received within said drum.

2. A meter as claimed in claim 1, wherein said scale has a slot, said first pointer being disposed on a first side of said scale, said second pointer being disposed on a second side of said scale and extending across said slot.

3. A meter as claimed in claim 2, wherein said slot has an arcuate shape, the radial center of which is displaced from said axis, said marks being uniformly disposed along said slot.

4. A meter as claimed in claim 3, further comprising an eccentric gear operatively connected between said second pointer and said control means adapted to compensate for said displacement between said center and said axis, whereby the value of said controllable element can be correctly determined by viewing said second pointer against said marks.

5. A meter as claimed in claim 4, wherein said eccentric gear comprises first and second sections mounted on said control means, and further comprising a cord secured at both ends to said sections respectively and being disposed about said sections and to frictionally engage said second pointer mounting means; whereby a movement applied to said control means will move said sections and said cord, thereby moving said second pointer.

6. An instrument comprising a case; a scale mounted on said case, a first movable pointer extending proximate said scale, means for moving said pointer as an output in accordance with the magnitude of an electric energization applied to said rotating means as an input, said output and input having a first relationship over their operative range, said scale, said first pointer, and said moving means defining a meter element, whereby the magnitude of said energization input can be determined by viewing said first pointer and said scale, a controllable element mounted on said case having an input and an output which have relative to one another a second relationship over their operative range which is different from said first relationship in a predetermined manner; involving non-linearity of at least one of said relationships, means operatively connected to said controllable element for controlling the input thereto, a second movable pointed disposed proximate said marks, and a compensating means having an input member and an output member, said output member being operatively connected to said second pointer and said input member being operatively connected to said control means for said controllable element, said compensating means having an input-output relationship over its operative range which is substantially the complement of the difference between said first and second relationships, whereby the setting of said controllable element and the magnitude of said meter energization both can be correctly determined by viewing said second and first pointers respectively with respect to the same scale.

7. A meter as claimed in claim 6, wherein said moving means comprises means for rotating said first pointer on an axis; and further comprising means for mounting said second pointer for rotation about said axis, said mounting means being operatively connected to said control means, whereby said pointers both rotate about said same axis.

8. A meter as claimed in claim 7, wherein said mounting means comprises a drum disposed concentric with said rotating means.

9. A meter as claimed in claim 7, wherein said compensating means comprises an eccentric gear having first and second sections comprising said input member mounted on said control means, and further comprising a cord comprising said output member secured at both ends to said sections respectively and being disposed about said sections and to frictionally engage said second pointer mounting means; whereby a movement applied to said control means will move said sections and said cord, thereby moving said second pointer.

10. A meter as claimed in claim 7, wherein said rotating means comprises a magnetic movement having a stator structure and rotor disposed within said stator, and means for mounting said second pointer on said stator structure.

11. A meter as claimed in claim 6, wherein said scale has a slot, said first pointer being disposed on a first side of said scale, said second pointer being disposed on a second side of said scale and extending across said slot.

12. A meter as claimed in claim 11, further comprising a mirror disposed on said second side of said scale, said second pointer being between said scale and said mirror.

13. A meter comprising a case; a slotted scale mounted within said case and having a plurality of calibration marks disposed along and proximate said slot on a first side of said scale; a movable first pointer disposed within said case on said scale side and extending across said calibration marks; means for moving said pointer in accordance with electric energization applied to said moving means, said moving means comprising means for rotating said pointer on an axis, a controllable element mounted on said case; means operably connected to said controllable element for controlling said element; and a second movable pointer operably connected to said control means and being disposed on a second side of said scale opposite from said first side and extending across said slot whereby the value of said controllable element can be determined by viewing said second pointer through said slot from said first scale side; means for mounting said second pointer for rotation about said axis, said mounting means being operably connected to said control means whereby said pointers both rotate about said same axis and comprising a hollow drum disposed concentric with said rotating means, said first pointer being mounted by means which is at least partially received within said drum.

14. A meter comprising a case; a slotted scale mounted within said case and having a plurality of calibration marks uniformly disposed along and proximate said slot on a first side of said scale; a movable first pointer disposed within said case on said first scale and extending across said calibration marks; means for moving said pointer in accordance with electric energization applied to said moving means, said moving means comprising means for rotating said first pointer on an axis; said slot having arcuate shape having a center displaced from said axis; a controllable element mounted on said case; means operably connected to said controllable element for controlling said element; a second movable pointer operably connected to said control means and being disposed on a second side of said scale opposite from said first side and extending across said slot; said moving means further comprising means for mounting said second pointer for rotation about said axis, said mounting means being operably connected to said control means whereby said pointers both rotate about said same axis; and an eccentric gear operably connected between said second pointer and said control means adapted to compensate for said displacement between said center and said axis; whereby the value of said controllable element can be correctly determined by viewing said second pointer against said marks.

15. A meter comprising a case; a slotted scale mounted within said case and having a plurality of calibration marks uniformly disposed along and proximate said slot on a first side of said scale; a movable first pointer disposed within said case on said first scale and extending across said calibration marks; means for moving said pointer in accordance with electric energization applied to said moving means, said moving means comprising means for rotating said first pointer on an axis; said slot having arcuate shape having a center displaced from said axis; a controllable element mounted on said case; means operably connected to said controllable element for controlling said element; a second movable pointer operably connected to said control means and being disposed on a second side of said scale opposite from said first side and extending across said slot; said moving means further comprising means for mounting said second pointer for rotation about said axis, said mounting means being operably connected to said control means whereby said pointers both rotate about said same axis; an eccentric gear operably connected between said second pointer and said control means adapted to compensate for said displacement between said center and said axis; said eccentric gear comprising first and second sections mounted on said control means, and further comprising a cord secured at both ends to said sections respectively and being disposed about said sections to frictionally engage said second pointer mounting means; whereby a movement applied to said control means will move said sections and said cord, thereby moving said second pointer.

16. A meter as claimed in claim 14 wherein said eccentric gear has an irregular surface.

* * * * *